JOHN SOUDER & ELIAS MILLER.
Improvement in Harvesters.

No. 115,376.                           Patented May 30, 1871.

UNITED STATES PATENT OFFICE.

JOHN SOUDER AND ELIAS MILLER, OF LITIZ, PENNSYLVANIA.

IMPROVEMENT IN HARVESTERS.

Specification forming part of Letters Patent No. 115,376, dated May 30, 1871.

We, JOHN SOUDER and ELIAS MILLER, of Litiz and its vicinity, in the county of Lancaster and State of Pennsylvania, have jointly invented an Improvement to be attached to Harvesters, of which the following is a specification:

The nature of our invention consists in the application of a rod attached at one end to the front of the inner shoe, and the other on the connecting-bar with the shoe on reaping-machines. This rod is so elevated, bent, and inclined as to get under the stalks of grain which may hang over the stubble of that previously cut, and in the path of the wheels of the machine or horses, and by it gradually raised up over the shoe, when it will be properly presented to the sickles, and with the rest lodged upon the platform in the ordinary way. Without such a lifting and guide rod it is well known that these inclined or overhanging heads are caught and carried under the slide-bar of the shoe, and consequently the heads of grain so clamped are cut off and remain on the ground, often causing a serious waste. Our object is to prevent this waste by the simple use of said rod.

The accompanying drawing illustrates the application.

Figure 1:
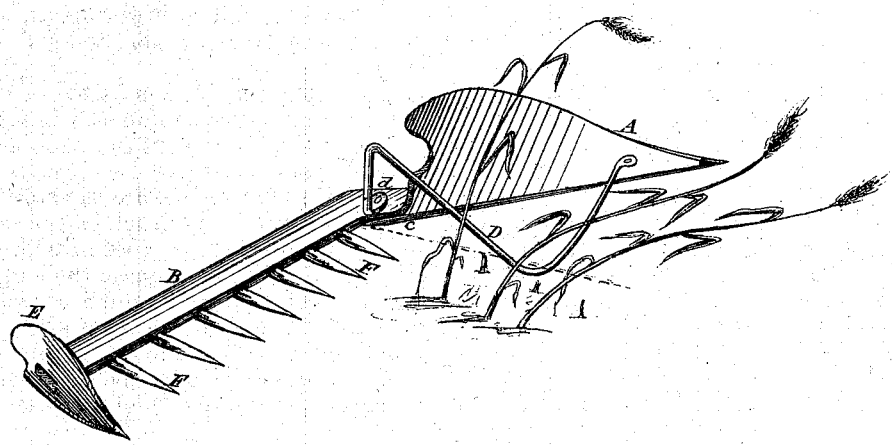
Figure 2:
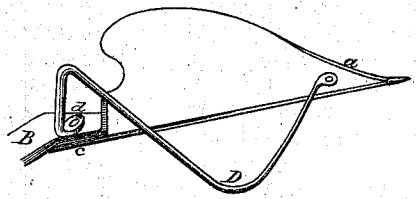

Figure 1 shows an ordinary sickle-bar, B, fingers F, outer dividing-shoe E, the inner shoe A on its slide-bar C, the rod D, attached at $a$ and $d$; Fig. 2, the same, simply showing the rod and shoe connections.

Any one one skilled in the art can make and use the same on inspection, and will require no lengthy description.

The foot of the rod $d$ is bolted or riveted on the supporting-bar behind the inner shoe A, (inside of the hinge next the shoe when such cutter-bars are used,) raised perpendicularly sufficiently high to elevate the stalks, and so inclined inward to the track of the sickles and downward as to be in close proximity to the ground in order to get under the lodged or inclined grain, and, as it slides forward, gradually raising it for the purpose already stated.

The rod may be made adjustable by screw-bolts and nuts to secure them, or bent, as experience or the necessity of the case may require.

We are not aware that a rod or raising-guide, applied to the inner shoe for such a purpose, was ever before known or used. We are aware that rods or their equivalent have been attached to the outer shoe, but for a different purpose; therefore

What we claim as our invention, and desire to secure by Letters Patent, is—

The combination of the rod D and shoe A, when constructed and arranged substantially as set forth.

JOHN SOUDER.
ELIAS MILLER.

Witnesses:
WILLIAM W. OCHME,
CHARLES W. BAKER.